United States Patent [19]

Katz et al.

[11] 4,001,592
[45] Jan. 4, 1977

[54] FILM IDENTIFICATION APPARATUS

[75] Inventors: Seymour Katz, Glen Cove; Victor R. Brown, West Hempstead, both of N.Y.

[73] Assignee: Ipco Hospital Supply Corporation, White Plains, N.Y.

[22] Filed: Jan. 28, 1976

[21] Appl. No.: 653,127

Related U.S. Application Data

[63] Continuation-in-part of Ser. No. 565,583, April 7, 1975, Pat. No. 3,959,657.

[52] U.S. Cl. .............................. 250/476; 354/105; 346/33 ME
[51] Int. Cl.[2] ....................................... G03B 41/16
[58] Field of Search ................... 250/476; 354/105; 346/107 R, 33 ME

[56] References Cited

UNITED STATES PATENTS

| | | | |
|---|---|---|---|
| 3,452,196 | 6/1969 | Gray | 250/476 |
| 3,488,753 | 1/1970 | Tone et al. | 250/476 |
| 3,679,902 | 7/1972 | Hurst et al. | 250/476 |
| 3,683,182 | 8/1972 | Farmer | 250/476 |
| 3,797,025 | 3/1974 | Murphy et al. | 354/105 |

*Primary Examiner*—Alfred E. Smith
*Assistant Examiner*—B. C. Anderson
*Attorney, Agent, or Firm*—Lee C. Robinson, Jr.

[57] ABSTRACT

Apparatus for placing identifying indicia on x-ray film within a cassette, in which an electroluminescent panel is provided with a resiliently biased slide element movably mounted on a cassette supporting member. A printing unit applies time and data information to an indicia bearing card and simultaneously activates a control circuit for a predetermined time interval to condition the circuit for the energization of the panel only during this interval. The thus imprinted card is then placed on the panel, and as the cassette is positioned on the supporting member a portion of the panel protrudes into a slot-shaped opening in one edge of the cassette. When the cassette reaches its proper position on the support member, the control circuit is effective to illuminate the panel and thereby expose the film with the information on the card.

11 Claims, 5 Drawing Figures

FILM IDENTIFICATION APPARATUS

CROSS-REFERENCE TO RELATED APPLICATION

This is a continuation-in-part of copending U.S. Pat. application Ser. No. 565,583 filed Apr. 7, 1975 by Seymour Katz and Victor R. Brown now U.S. Pat. No. 3,959,657.

BACKGROUND OF THE INVENTION

This invention relates to film identification apparatus and more particularly to such apparatus for placing identifying indicia on photographic film.

The present invention, while of general application, is particularly well suited for applying identifying indicia to x-ray or other radiographic film. In many modern hospitals, for example, the problem of accurately correlating the identity of a patient with a particular x-ray photograph has become increasingly acute. Some of the early attempts to resolve this problem entailed the use of lead letters or symbols which were arrayed against the face of an x-ray cassette adjacent one of its edges. The film was then exposed either by the same x-ray machine used to photograph the patient or with a different x-ray machine. With the increasingly large numer of x-rays taken in a given hospital, however, the task of assembling the individual letters or symbols to provide such patient identification became correspondingly burdensome and expensive, and the procedures used for accomplishing this were subject to many opportunities for both human and mechanical error.

More recently, attempts to resolve the film identification problem made use of typed cards on an electroluminescent panel. The panel and card assembly was inserted in a corresponding opening in one edge of the cassette such that, upon the illumination of the panel, the information on the card was reproduced on the film.

Film identification apparatus of the foregoing type have exhibited several disadvantages. As an illustration, it often is important to not only correlate a particular film with the identity of the subject but also to record the time the photograph was taken, and several of the apparatus previously employed have proved deficient in this respect. Also, many types of apparatus utilized heretofore included an electroluminescent panel which, to provide the desired illumination, needed to be too thin to have sufficient structural rigidity to withstand repeated insertion and withdrawal in the openings of successive cassettes. In an effort to alleviate this latter problem, certain types of such prior apparatus enclosed the panel within a rigid tongue member which was inserted into the openings in the cassette together with the typed card and the panel itself. However, such a tongue member not only required an unnecessarily large opening, but it also was not suitable for use with many of the thinner types of cassettes. In addition, the comparatively massive tongue member frequently interfered with the legibility of the indicia formed on the film and had other disadvantages.

SUMMARY

One general object of this invention, therefore, is to provide new and improved apparatus for placing identifying indicia on photographic film.

More specifically, it is an object of this invention to provide such film identification apparatus which places on the film an accurate indication of the identity of the subject and the time the photograph was taken.

An additional object of the invention is to provide x-ray film identification apparatus having an illuminating panel which is adequately supported and yet does not require the insertion into the cassette of anything other than the panel itself and an identifying card.

Another object of the invention is to provide film identification apparatus of the character indicated in which the insertion of the illuminating panel is greatly facilitated.

A further object of the invention is to provide film identification apparatus in which the panel may not be illuminated except during a short predetermined time interval.

Still another object of the invention is to provide film identification apparatus which is economical to manufacture and thoroughly reliable in operation.

In one illustrative embodiment of the invention, the apparatus includes a cassotte supporting member having a suitable guide element for receiving an x-ray cassette. An electroluminescent panel is mounted on the supporting member, and a card or other appropriate indicia means is removably disposed on a protruding tab portion of the panel. When the panel and card assembly are properly located within an edge opening in the cassette, the panel is illuminated to thereby expose the film with the information on the card.

In accordance with one feature of the invention, immediately prior to the positioning of the indicia means on the electroluminescent panel an indicia applying unit is activated to apply time or other information to the indicia means. When the panel is subsequently illuminated, the applied information is automatically recorded on the film.

In accordance with an additional feature of several embodiments of the invention, the application of the information to the indicia means simultaneously activates the control circuit for the electroluminescent panel to condition the circuit for the energization of the panel. The control circuit is activated for a comparatively short time interval which is just sufficient to permit the placing of the panel and indicia means assembly within the cassette and the illumination of the panel. With this arrangement, the time recorded on the indicia means represents a close approximation of the time the information is applied to the film.

In accordance with another feature of the invention, in a number of advantageous arrangements, the apparatus is provided with a novel slide mechanism which is movably mounted on the cassette supporting member in position to protect the protruding tab portion of the panel or other illumination means. The slide mechanism is engaged by one of the edges of the cassette and is urged thereby away from protecting relationship with the tab portion as the cassette is received by the supporting member, such that only the tab portion and the indicia means extend within the cassette opening. The arrangement is such that the illumination means is fully protected at all times, and yet there is no necessity for inserting the protecting structure into the cassette itself.

In accordance with still another feature of the invention, in certain particularly important embodiments, the protruding portion of the illumination means is pivotally movable relative to the remaining portion. The protruding portion may be readily swung into a position in which the indicia means is quickly and easily applied thereto, and it then automatically returns to its initial position in condition for insertion into the cassette.

In accordance with a further feature of some embodiments of the invention, the control circuit is automatically responsive to the receipt of a cassette by the supporting member for energizing the illumination means, and the cassette is then withdrawn from the supporting member with the film properly exposed with the information on the indicia means.

The present invention, as well as further objects and features thereof, will be understood more clearly and fully from the following description of certain preferred embodiments, when read with reference to the accompanying drawings.

DESCRIPTION OF A PREFERRED EMBODIMENT

Figure 1:
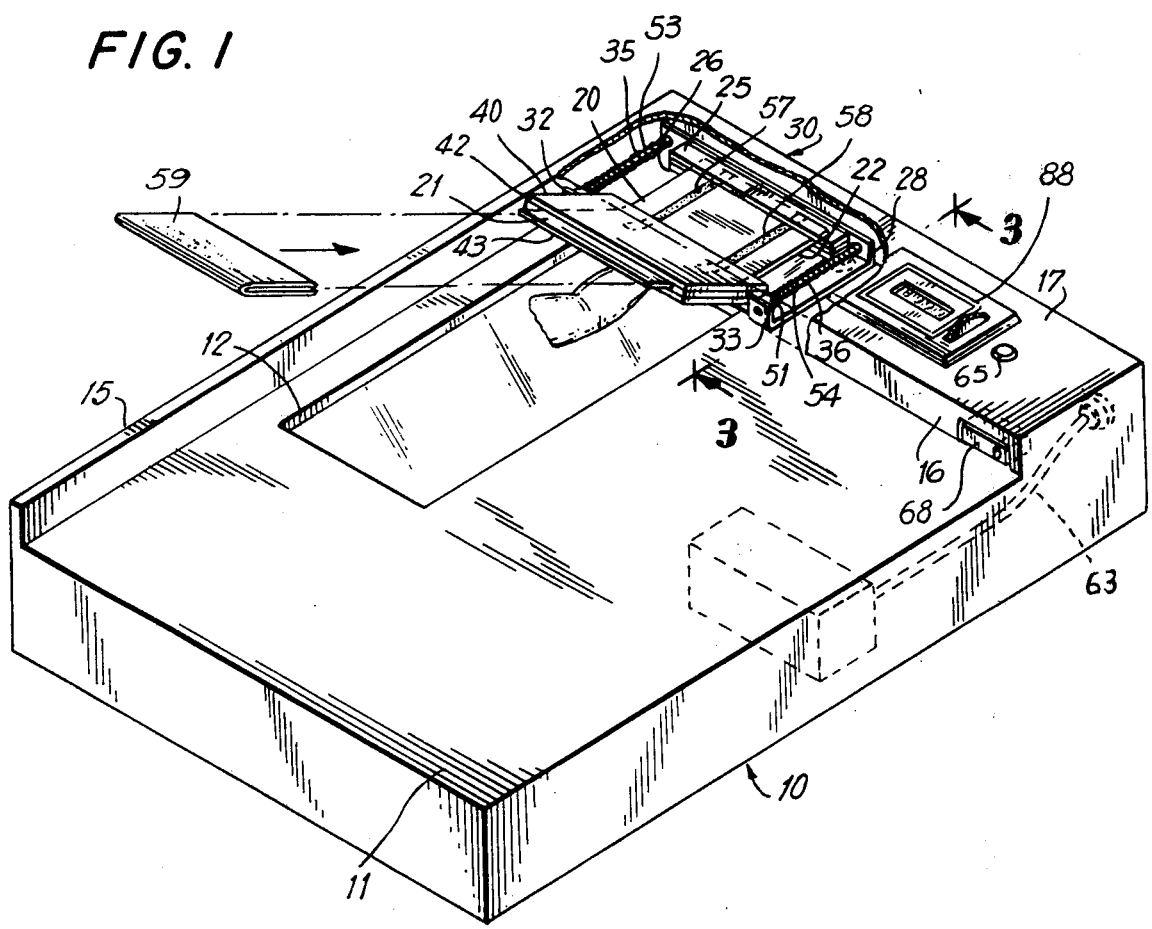
FIG. 1 is a perspective view of the cassette receiving portion of a film identifying apparatus in accordance with one illustrative embodiment of the invention.

Referring to FIG. 1 of the drawings, there is shown a film identification apparatus which includes a box-like support member indicated generaly at 10. The support member 10 is provided with a flat horizontal surface 11 of a size sufficient to accommodate an x-ray film cassette (not shown in FIG. 1). This surface contains a rectangular access opening 12, and a guide flange 15 extends upwardly from one of the side edges of the surface in order to properly locate the cassette thereon. An upstanding abutment flange 16 extends along the rear edge of the surface 11 and serves as a stop for the cassette. The flange 16 forms a portion of a ledge 17 which is located a short distance above the plane of the surface 11 and encloses the various electrical components of the apparatus.

An electroluminescent panel 10 is carried by the support member 10 adjacent the ledge 17. The panel 20 is of flat rectangular configuration and may be of several commercially available types which are electrically energized to emit light of sufficient intensity to expose x-ray film. The panel 20 is provided with a protruding tab portion 21 and a stationary rear portion 22 in pivotal relationship with each other. The tab portion 21 extends over the cassette receiving surface 11, while the rear portion 22 is rigidly affixed to the support member 10 by a pair of clamping plates 25 and 26.

The clamping plates 25 and 26 are welded or otherwise secured to an upstanding flange 28 on a mounting bracket 30. The bracket 30 serves as a support for the electroluminescent panel 20 and is permanently affixed within the ledge portion 17 of the support member 10. The flange 28 extends along the rear edge of the bracket 30, while the forward edge includes a pair of upstanding ears 32 and 33 such that the bracket exhibits a generally channel-shaped cross-section. The ears 32 and 33 respectively support the forward ends of guide rods 35 and 36, the rear ends of these rods being affixed to the flange 28.

A slide member 40 is movably carried by the guide rods 35 and 36. The slide member 40 comprises an upper plate 42 and a lower plate 43 which are spaced apart adjacent the opposite surfaces of the electroluminescent panel 20. The rearward edge of the slide member 40 (the right-hand edge, as viewed in FIG. 1) is pivotally secured to two collars 50 and 51 which extend around the guide rods 35 and 36 in slidable relationship therewith. The collars 50 and 51, and hence the slide member 50, are resiliently biased in their forward positions by coil springs 53 and 54 around the rods 35 and 36.

The arrangement is such that the assembly comprising the slide member 40 and the collars 50 and 51 is slidably movable from its forward to its rearward position against the resilient biasing force of the springs 53 and 54. In addition, the member 40 together with the tab portion 21 of the electroluminescent panel 20, may be pivoted in an upward direction about the member's rearward edge. This pivotal movement is resisted by suitable biasing springs (not visible herein but shown in the aforementioned application Ser. No. 565,583) which serve to normally maintain the member 40 and the tab portion 21 in substantially coplanar relationship with the rear portion 22 of the panel. This latter portion of the panel is provided with electrically conductive strips 57 and 58 for energizing the panel.

Figure 4:
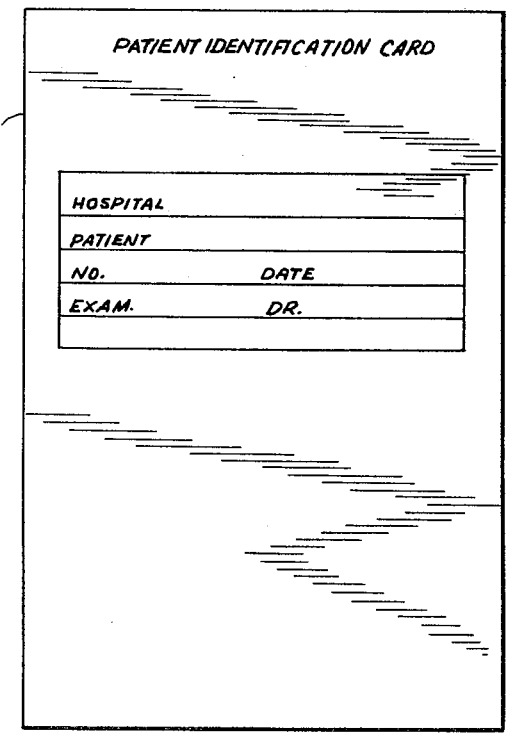
FIG. 4 is a plan view of an indicia bearing card useful with the apparatus.

The tab portion 21 of the electroluminescent panel 20 is adapted to receive a folded identification card 59. As best shown in FIG. 4, the card 59 illustratively comprises a simple 3×5 cardboard card of the type normally used in index files and includes suitable indicia such as the hospital, the patient's name and identification number, the date, the type of examination, the physician, etc.

Electrically connected to the support member 10 is a printing unit indicated generally at 60. The unit 60 is adapted to apply time and date information to the card 59 and to also activate and deactivate a control circuit 74 (FIG. 5) for the electroluminescent panel 20 at preselected times. In addition, the unit 60 provides a visual display of the date and time in accordance with the twenty-four hour timekeeping system. A line cord 61 serves to connect the unit 60 to a standard a.c. power supply, and the unit in turn is connected to the control circuit by a cable 63.

Figure 5:
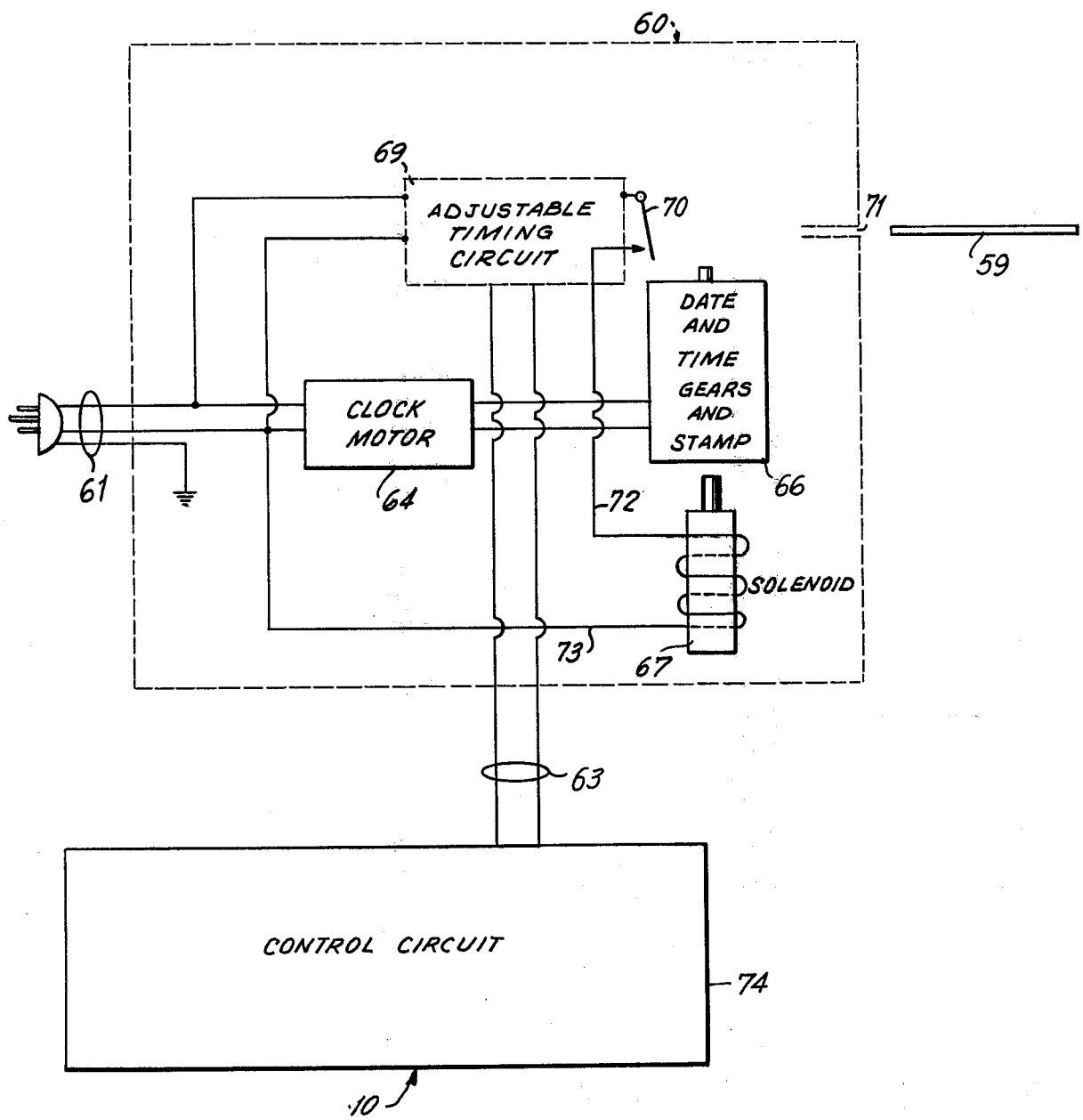
FIG. 5 is a schematic electrical diagram of the control circuit for the apparatus.

As best shown in FIG. 5, the printing unit 60 includes the usual clock motor 64, a gear and stamp assembly 66 and a print solenoid 67. These components by themselves are conventional and illustratively may be of the type available commercialy from Time Systems International, Inc., New York, N.Y. The motor 64 is supplied with timing intelligence from the a.c. signal applied to the line cord 61.

An adjustable timing circuit 69 is connected to the line cord 61 in parallel with the clock motor 64. The timing circuit 69 includes a normally open switch 70 which is closed by the card 59 upon its insertion into a suitable slot 71. The switch 70 is connected by a conductor 72 to one terminal of the solenoid 67, and the other solenoid terminal is connected by a conductor 73 to the opposite side of the cord 61.

Upon the closing of the switch 70, the timing circuit 69 is effective to supply power for a predetermined time interval over the cable 63 to the control circuit 74 for the electroluminescent panel 20. This interval, illustratively of the order of thirty seconds, should be just sufficient to permit the removal of the card 59 from the slot 71, the insertion of the card on the panel 20, and the positioning of the card and panel assembly within a cassette for a length of time which enables the making of a proper exposure. The circuit 69 includes a suitble time delay relay which continues the application of power to the circuit 74 following the momentary closing of the switch 70 to activate the circuit 74 and condition it for the energization of the panel 20. Upon the expiration of the preset interval, the relay automatically deactivates the circuit 74 to prevent further energization of the panel. The interval is adjustable in known manner to vary the period of activation of the circuit in accordance with the particular operating conditions.

As more fully described in the copending patent application referred to above, the control circuit 74 is provided with an indicator light 65 (FIG. 1) and a microswitch 68. The light 65 is mounted on the ledge 17 in position to be observed by the operator of the apparatus and is illuminated during the period of activation of the control circuit to inform the operator that the circuit is in condition for the energization of the electroluminescent panel 20 in response to the actuation of the switch 68. In cases in which it is desired to provide a visual indication of the number of energization of the panel 20, a counter 88 also may be mounted on the ledge 17.

Figure 2:
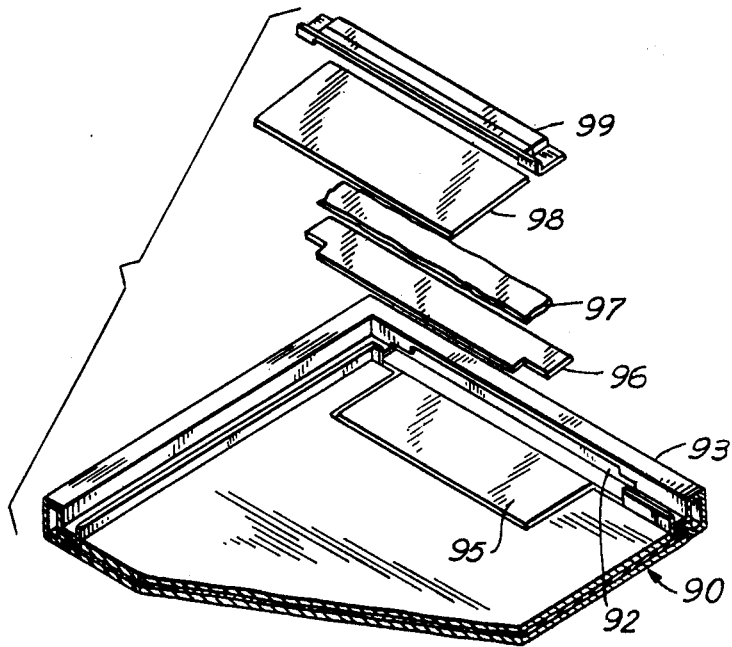
FIG. 2 is a fragmentary perspective exploded view of an x-ray cassette useful with the apparatus of FIG. 1.
Figure 3:
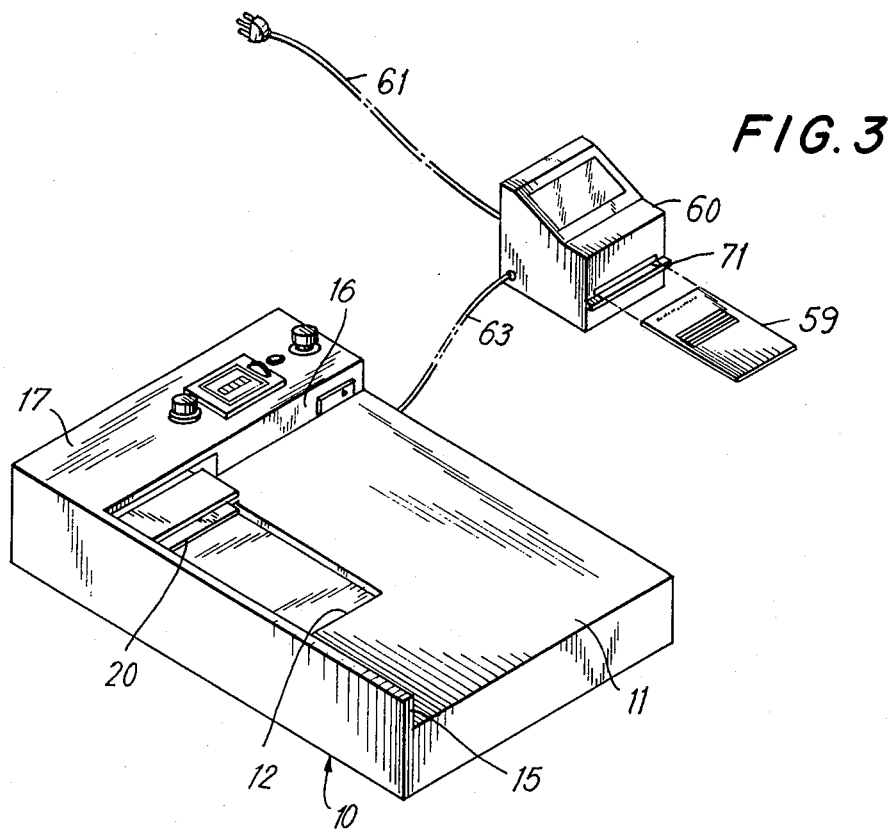
FIG. 3 is a perspective view of the apparatus illustrated in FIG. 1 together with certain ancillary components.

A suitable x-ray cassette 90 with which the apparatus may be employed is illustrated in FIG. 2. The cassette 90 includes a slot-shaped opening 92 in one of the edges 93 of the cassette frame. A rectangular plate 95 of lead is affixed to the inner face of the cassette adjacent the opening 92, and this plate serves as a shield to prevent x-ray radiation from reaching the identification area of the film within the cassette. Supported immediately above the lead plate 95 is a guide plate 96 which defines the lower portion of the opening 92. The upper portion of the opening is formed by a felt strip 97 to thereby prevent unwanted light from entering the cassette. The strip is adhesively secured to a transparent plastic panel 98 which is held in position through the use of a generally channel-shaped cover 99.

Identifying information may be applied to the film either prior to subsequent to the taking of an x-ray photograph in accordance with standard procedures at the particular hospital. In some cases, for example, information such as the hospital, the patient's name and number, the type of examination and the physician is typed on the card at the time a patient is admitted to the hospital, and the card is removably inserted in a suitable window on the cover of the patient's file. As the patient enters the x-ray room preparatory to the taking of the x-ray, the card is removed from the window and is inserted in the slot 71 in the printing unit 60.

As the card 59 enters the slot 71, the switch 70 closes to simultaneously energize the print solenoid 67 and to actuate the timing circuit 69 to apply power to the control circuit 74. The solenoid 67 prints the correct time and date in the appropriate space on the card 59. The timing circuit 69 remains actuated for a period of time sufficient to permit the transfer of the information on the card to the x-ray film within the cassette.

To transfer the information on the card 59 to the x-ray film, the card is removed from the slot 71 and is slipped over the protruding tab portion 21 of the electroluminescent panel 20. In the embodiment illustrated in FIG. 1, for example, the portion 21 and the protecting slide member 40 may be pivoted manually to move the portion 21 to a convenient location for the insertion of the card. In other embodiments the card is inserted while the portion 21 and the member 40 remain in their horizonal positions. In either case, the two flaps of the card are respectively disposed in facing juxtaposition with the upper and lower surfaces of the portion 21.

One of the cassettes 90 containing x-ray film is then positioned on the flat surface 11 of the support member 10 with the slotted edge 93 of the cassette in facing juxtaposition with the abutment flange 16. An adjacent edge of the cassette bears against the upstanding flange 15 to facilitate the guiding of the cassette toward the electroluminescent panel 20 and its protecting slide member 40. As the cassette edge 93 engages the member 40, the member is urged in a rearward direction against the resilient bias of the springs 53 and 54. The member 40 is thereby moved away from protecting relationship with the protruding tab portion 21 such that only the tab portion 21 and the indicia bearing card 59 enter the cassette opening 92. The portion 21 and the card 59 are located within the cassette between the lead blocker plate 95 (FIG. 2) and the x-ray film.

As the cassette 90 continues its movement along the support member surface 11 and approaches the abutment flange 16, the cassette edge 93 contacts the microswitch 68 to energize the electroluminescent panel 20 for a period of time, illustratively 0.1 seconds, determined by the desired exposure time of the film within the cassette. The panel 20 illuminates the card 59 within the cassette opening 92 and thereby exposes the film within the cassette with the information on the card. The panel 20 is in close juxtaposition with the film within the cassette, being separated therefrom only by the card 59. The card itself is in face-to-face contact with the film, with the result that only an extremely short exposure time is needed to properly expose the film and provide a very clear and well defined legend thereon. The panel 20 is automatically de-energized after a predetermined time interval determined by the desired exposure time.

When the exposure is completed, the cassette 90 is removed from its position on the support member 10, and the resilient biasing springs 53 and 54 automatically return the slide member 40 to its initial position in protecting relationship with the tab portion 21 of the electroluminescent panel 20. The printing unit 60 thereupon automatically deactivates the control circuit 74 after the preset time interval determined by the timing circuit 69. The arrangement is such that the time recorded on the x-ray film is a close approximation (within say thirty seconds) of the time the film was exposed, and the operator cannot thereafter apply the information to the film without stamping a new time on the card by means of the unit 60.

In certain advantageous embodiments of the invention a densiometric scale is printed on the card 59. This scale illustratively may conform to the so-called greywedge scale currently standard in the industry to test the efficacy of x-ray film. When the film is exposed by the electroluminescent panel 20, the scale enables the ready determination of the film's conditin without the need for dark room analysis.

Although the invention has been described and illustrated as having particular utility in the identification of x-ray film, it also may be advantageously employed to identify other types of photographic film. As an illustration, the invention may be used by photographers, etc., to identify the film within film packs and similar devices. Various other uses will suggest themselves to those skilled in the art upon a perusal of the foregoing disclosure.

The terms and expressions which have been employed are used as terms of description and not of limitation, and there is no intention in the use of such terms and expressions of excluding any equivalents of the features shown and described, or portions thereof, it being recognized that various modifications are possible within the scope of the invention claimed.

What is claimed is:

1. Apparatus for placing identifying indicia on x-ray film,
    an electroluminescent panel having a protruding tab portion in position to overlie a portion of the x-ray film;
    indicia means removably disposed on the protruding tab portion of the electroluminescent panel;
    a control circuit connected to the electroluminescent panel for energizing said panel, to illuminate the same and thereby expose the film which the information on the indicia means; and
    indicia applying means electrically connected to the control circuit for imprinting information on said indicia means, said indicia applying means including an opening for receiving said indicia means, and means automatically responsive to the receipt of said indicia means in said opening for simultaneously applying said information thereto and activating said control circuit to condition the same for the energization of said panel.

2. Apparatus for placing identifying indicia on x-ray film, the apparatus comprising, in combination:
    an electroluminescent panel caried by the supporting member, the panel having a protruding tab portion in position to overlie a portion of the x-ray;
    indicia means removably disposed on the protruding tab portion of the electroluminescent panel;
    a control circuit connected to the electroluminescent panel for energizing said panel, to illuminate the same and thereby expose the film with the information on the indicia means;
    indicia applying means electrically connected to the control circuit for applying information to said indicia means, said indicia applying means including an opening for receiving said indicia means, and means automatically responsive to the receipt of said indicia means in said opening for simultaneously applying said information thereto and activating said control circuit to condition the same for the energization of said panel; and
    means responsive to the receipt of said indicia means by said indicia applying means for automatically deactivating said control circuit after a predetermined time interval, to thereby prevent further energization of said panel.

3. Apparatus as defined in claim 2, in which the indicia applying means imprints time and date information on said indicia means.

4. Apparatus for placing identifying indicia on film within a cassette, the apparatus comprising, in combination:
    a cassette supporting member;
    an electroluminescent panel carried by the supporting member, the panel having a protruding tab portion in position to extend within a cassette received by said member;
    indicia means removably disposed on the protruding tab portion of the electroluminescent panel;
    a control circuit connected to the electroluminescent panel for energizing said panel, to illuminate the same and thereby expose the film within the cassette with the information on the indicia means; and
    indicia applying means electrically connected to the control circuit for imprinting information on said indicia means, said indicia applying means including an opening for receiving said indicia means, and means automatically responsive to the receipt of said indicia means in said opening for simultaneously applying said information thereto and activating said control circuit to condition the same for the energization of said panel.

5. Apparatus for placing identifying indicia on film within a cassette having a panel receiving slot adjacent one edge thereof, the apparatus comprising, in combination:
    a cassette supporting member;
    an electroluminescent panel carried by the supporting member, the panel having a protruding tab portion in position to extend within the slot of a cassette received by said member;
    indicia means removably disposed on the protruding tab portion of the electroluminescent panel;
    a control circuit connected to the electroluminescent panel for energizing said panel, to illuminate the same and thereby expose the film within the cassette with the information on the indicia means;
    indicia applying means electrically connected to the control circuit for applying information to said indicia means, said indicia applying means including an opening for receiving said indicia means, and means automatically responsive to the receipt of said indicia means in said opening for simultaneously applying said information thereto and activating said control circuit to condition the same for the energization of said panel; and
    means responsive to the receipt of said indicia means by said indicia applying means for automatically deactivating said control circuit after a predetermined time interval, to thereby prevent further energization of said panel.

6. Apparatus for placing identifying indicia on x-ray film within a cassette, the apparatus comprising, in combination:
    a cassette supporting member;
    an electroluminescent panel carried by the supporting member, the panel having a protruding tab portion in position to extend within a cassette received by said member;
    indicia means removably disposed on the protruding tab portion of the electroluminescent panel;
    a control circuit connected to the electroluminescent panel for energizing said panel, to illuminate the same and thereby expose the film within the cassette with the information on the indicia means;
    indicia applying means electrically connected to the control circuit for applying information to said indicia means, said indicia applying means including an opening for receiving said indicia means, and means automatically responsive to the receipt of said indicia means in said opening for simultaneously applying said information thereto and activating said control circuit to condition the same for the energization of said panel; and slide means movably mounted on the cassette supporting member adjacent the opposite surfaces of the electroluminescent panel for supporting the same, the slide means being engaged by said cassette and being urged thereby away from supporting relationship with the surfaces of said panel as the cassette is received by said supporting member, such that only the tab portion of said panel and said indicia means extend within said slot.

7. Apparatus as defined in claim 6 which further comprises, in combination:

means responsive to the receipt of said incidia means by said indicia applying means for deactivating said control circuit after a predetermined time interval, to thereby prevent further energization of said panel.

8. Apparatus for placing identifying indicia on x-ray film within a cassette, the apparatus comprising, in combination:

a cassette supporting member;

an electroluminescent panel carried by the supporting member, the panel having a protruding tab portion in position to extend within a cassette received by said member;

indicia means removably disposed on the protruding tab portion of the electroluminescent panel;

a control circuit connected to the electroluminescent panel for energizing said panel, to illuminate the same and thereby expose the film within the cassette with the information on the indicia means;

indicia applying means electrically connected to the control circuit for imprinting time and date information on said indicia means, said indicia applying means including an opening for receiving said indicia means, and means automatically responsive to the receipt of said indicia means in said opening for simultaneously applying said information thereto and activating said control circuit to condition the same for the energization of said panel;

slide means movably mounted on the cassette supporting member adjacent the opposite surfaces of the electroluminescent panel for supporting the same, the slide means being engaged by said cassette and being urged thereby away from supporting relationship with the surfaces of said panel as the cassette is received by said supporting member, such that only the tab portion of said panel and said indicia means extend within said slot; and means for resiliently biasing the slide means into supporting relationship with the surfaces of said panel.

9. Apparatus for placing identifying indicia on x-ray film within a cassette having a panel receiving slot adjacent one edge thereof, the apparatus comprising, in combination:

a cassette supporting member;

an electroluminescent panel carried by the supporting member, the panel having a protruding tab portion in position to extend within the slot of a cassette received by said member;

indicia means removably disposed on the protruding tab portion of the electroluminescent panel;

a control circuit connected to the electroluminescent panel and automatically responsive to the receipt of a cassette by the supporting member for energizing said panel, to illuminate the same and thereby expose the film within the cassette with the information on the indicia means;

indicia applying means electrically connected to the control circit for imprinting time and date information on said indicia means, said indicia applying means including an opening for receiving said indicia means, and means automatically responsive to the receipt of said indicia means in said opening for simultaneously applying said information thereto and activating said control circuit to condition the same for the energization of said panel;

means responsive to the receipt of said indicia means by said indicia applying means for automatically deactivating said control circuit after a predetermined time interval, to thereby prevent further energization of said panel;

slide means movably mounted on the cassette supporting member adjacent the opposite surfaces of the electroluminescent panel for supporting the same, the slide means being engaged by said cassette and being urged thereby away from supporting relationship with the surfaces of said panel as the cassette is received by said supporting member, such that only the tab portion of said panel and said indicia means extend within said slot; and means for resiliently biasing the slide means into supporting relationship with the surfaces of said panel.

10. Apparatus for placing identifying indicia on x-ray film within a cassette having a panel receiving slot adjacent one edge thereof, the apparatus comprising, in combination:

a cassette supporting member including edge guide means for receiving a cassette;

an electroluminescent panel carried by the supporting member, the panel having a pivotally mounted protruding tab portion in position to extend within the slot of a cassette received by said member;

indicia means removably disposed on the protruding tab portion of the electroluminescent panel;

a control circuit connected to the electroluminescent panel and automatically responsive to the receipt of a cassette by the supporting member for energizing said panel, to illuminate the same and thereby expose the film within the cassette with the information on the indicia means;

indicia applying means electrically connected to the control circuit for imprinting time and date information on said indicia means, said indicia applying means including an opening for receiving said indicia means, and means automatically responsive to the receipt of said indicia means in said opening for simultaneously applying said information thereto and activating said control circuit to condition the same for the energization of said panel;

means responsive to the receipt of said indicia means by said indicia applying means for automatically deactivating said control circuit after a predetermined time interval, to thereby prevent further energization of said panel;

slide means movably mounted on the cassette supporting member adjacent the opposite surfaces of the electroluminescent panel for supporting the same, the slide means being engaged by said one cassette edge and being urged thereby away from supporting relationship with the surfaces of said panel as the cassette is received by said supporting member, such that only the tab portion of said panel and said indicia means extend within said slot; and means for resiliently biasing the slide means into supporting relationship with the surfaces of said panel.

11. Apparatus as defined in claim 10, in which said indicia applying means includes a visual display of the correct date and time.

* * * * *